US009741983B2

(12) United States Patent
Poller et al.

(10) Patent No.: US 9,741,983 B2
(45) Date of Patent: Aug. 22, 2017

(54) BATTERY UNIT COMPRISING AN ACCOMMODATING DEVICE AND A PLURALITY OF ELECTROCHEMICAL CELLS AND BATTERY MODULE COMPRISING A PLURALITY OF SUCH BATTERY UNITS

(71) Applicant: Robert Bosch GmbH, Stuttgart (DE)

(72) Inventors: Silvan Poller, Neisseaue ot Kaltwasser (DE); Martin Gerlach, Strullendorf (DE); Holger Reinshagen, Bamberg (DE); Rudi Kaiser, Bamberg (DE); Sarmimala Hore, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 236 days.

(21) Appl. No.: 14/689,121

(22) Filed: Apr. 17, 2015

(65) Prior Publication Data
US 2015/0303422 A1    Oct. 22, 2015

(30) Foreign Application Priority Data

Apr. 17, 2014   (DE) ..................... 10 2014 207 403

(51) Int. Cl.
*H01M 2/10*     (2006.01)
*H01M 2/12*     (2006.01)
(Continued)

(52) U.S. Cl.
CPC ....... *H01M 2/1077* (2013.01); *H01M 2/0413* (2013.01); *H01M 2/1258* (2013.01);
(Continued)

(58) Field of Classification Search
CPC ............. H01M 10/482; H01M 10/613; H01M 10/6554; H01M 10/6556; H01M 2/0413;
(Continued)

(56) References Cited

U.S. PATENT DOCUMENTS 6,864,013 B2   3/2005  Gow et al.
2002/0085355 A1*  7/2002  Oda ........................ B60K 1/04
                                                             361/695

(Continued)

FOREIGN PATENT DOCUMENTS

| DE | 60200001      | 3/2004  |
| DE | 202010004637  | 8/2011  |
| DE | 102012205019  | 10/2013 |
| DE | 102012205810  | 10/2013 |

(Continued)

*Primary Examiner* — Carlos Barcena
(74) *Attorney, Agent, or Firm* — Michael Best & Friedrich LLP

(57) ABSTRACT

A battery unit (1) comprising a plurality of electrochemical cells (2), which each have an electrode arrangement (3) comprising a cathode contact-making element (4) and an anode contact-making element (5), and an accommodating device (6) comprising a plurality of accommodating units (7), which are each separated from one another by side walls (8), wherein in each case the electrode arrangement (3) of an electrochemical cell (2) of the battery unit (1) is introduced into the accommodating units (7), and the accommodating units (7) are closed by at least one electrolytic barrier (10), which is connected to the accommodating device (6), in such a way that the closed accommodating units (7) with the electrode arrangements (3) arranged therein form the electrochemical cells (2) of the battery unit (1).

21 Claims, 4 Drawing Sheets

(51) Int. Cl.

| | |
|---|---|
| *H01M 2/20* | (2006.01) |
| *H01M 10/48* | (2006.01) |
| *H01M 10/6556* | (2014.01) |
| *H01M 2/04* | (2006.01) |
| *H01M 2/30* | (2006.01) |
| *H01M 10/6554* | (2014.01) |
| *H01M 10/613* | (2014.01) |

(52) U.S. Cl.
CPC ............ *H01M 2/206* (2013.01); *H01M 2/30* (2013.01); *H01M 10/482* (2013.01); *H01M 10/613* (2015.04); *H01M 10/6554* (2015.04); *H01M 10/6556* (2015.04); *H01M 2/1229* (2013.01)

(58) Field of Classification Search
CPC ............ H01M 2/1077; H01M 2/1229; H01M 2/1258; H01M 2/206; H01M 2/30
See application file for complete search history.

(56) References Cited

U.S. PATENT DOCUMENTS

| | | | |
|---|---|---|---|
| 2005/0231158 A1* | 10/2005 | Higashino | H01M 2/1077 320/112 |
| 2008/0231232 A1* | 9/2008 | Seo | H01M 10/482 320/134 |
| 2010/0216004 A1* | 8/2010 | Yoon | H01M 2/0242 429/99 |
| 2011/0195284 A1* | 8/2011 | Yasui | H01M 2/0242 429/82 |
| 2012/0094156 A1* | 4/2012 | Lim | H01M 2/12 429/82 |
| 2013/0095356 A1* | 4/2013 | Shimizu | H01M 2/1077 429/88 |

FOREIGN PATENT DOCUMENTS

EP 2202824 6/2010

* cited by examiner

BATTERY UNIT COMPRISING AN ACCOMMODATING DEVICE AND A PLURALITY OF ELECTROCHEMICAL CELLS AND BATTERY MODULE COMPRISING A PLURALITY OF SUCH BATTERY UNITS

BACKGROUND OF THE INVENTION

The invention relates to a battery unit comprising a plurality of electrochemical cells, which each have an electrode arrangement comprising a cathode contact making element and an anode contact making element, and an accommodating device comprising a plurality of accommodating units, which are each separated from one another by side walls.

Furthermore, the invention relates to a battery module comprising a plurality of battery units.

Batteries comprising a plurality of electrochemical cells which are interconnected electrically to one another are known in various configurations from the prior art. Furthermore, battery modules are known which have a plurality of battery cells interconnected with one another as electrochemical cells.

For example, the document EP 2 202 824 A1 discloses a battery module comprising a plurality of battery cells, wherein the battery cells have a first electrode and a second electrode. The battery module disclosed in said document furthermore comprises an accommodating device comprising accommodating units arranged next to one another, into which battery cells are introduced. The accommodating device in this case has a first housing part comprising a first connection terminal and a second housing part comprising a second connection terminal for making contact with the electrodes of the battery cells. Furthermore, said document discloses interconnecting a plurality of such battery modules electrically with one another.

The document U.S. Pat. No. 6,864,013 B2 furthermore discloses an energy storage unit in the form of a battery pack, which has a plurality of electrochemical cells which are arranged in a battery housing, wherein a dedicated compartment on the side of the housing is provided for each of the cells. In this case, the housing can have integrated cooling channels for cooling the battery cells.

The document DE 10 2012 205 019 A1 discloses a module cover which comprises a cell contact making system comprising a plurality of cell connectors for making contact with battery cells arranged in a battery housing.

Disadvantages with battery units and battery modules known from the prior art consist in particular in the interconnection of the electrochemical cells, in the size of the battery units and battery modules, primarily in respect of battery units or battery modules to be used in hybrid, plug in hybrid or electric vehicles, and in the variability of battery units and battery modules in respect of adaptation to different requirements which are to be made of a battery unit or a battery module, for example as regards the capacity and/or power to be provided.

SUMMARY OF THE INVENTION

Against this background, one object of the invention consists in providing a battery unit which is improved in respect of the abovementioned disadvantages and an improved battery module. In particular, a battery unit is intended to be provided which has a higher energy density, i.e. has smaller dimensions and therefore takes up less space given the same capacity and power as a conventional battery unit.

In order to achieve the object, the invention proposes a battery unit comprising a plurality of electrochemical cells, which each have an electrode arrangement comprising a cathode contact making element and an anode contact making element, and an accommodating device comprising a plurality of accommodating units, which are each separated from one another by side walls, wherein in each case the electrode arrangement of an electrochemical cell of the battery unit is introduced into the accommodating units, and the accommodating units are closed by at least one electrolytic barrier, which is connected to the accommodating device, in such a way that the closed accommodating units with the electrode arrangements arranged therein form the electrochemical cells of the battery unit. In particular, provision is made here for an electrode arrangement within the meaning of the present invention to comprise the active material of an electrochemical cell, i.e. in particular a cathode material, an anode material, a separator and an electrolyte, preferably a solid electrolyte. In particular, provision is made for the electrode arrangement to be in the form of a jelly roll or cell stack. Owing to the side walls of the accommodating device, the individual electrode arrangements are in this case advantageously electrically insulated from one another. The at least one electrolytic barrier which is connected to the accommodating device in this case advantageously prevents a liquid electrolyte from emerging out of the accommodating unit and closes off the accommodating unit from the outside. In particular, provision is made for the electrolytic barrier to be a plastic film, in particular a film consisting of polyethylene (PE) or polyether ether ketone (PEEK). In accordance with one advantageous variant configuration, a metallic cooling plate with flat insulation is provided as electrolytic barrier.

In particular, provision is made for the electrochemical cell to be a lithium based cell, and in particular provision is made for the positive electrode of an electrochemical cell of the battery unit to contain lithium compounds, in particular LiF, Li oxide, Li sulfur or an Li composite. In accordance with a further advantageous variant configuration, the positive electrode of an electrochemical cell of the battery unit contains Na compounds.

In contrast to battery modules known from the prior art, in the battery unit according to the invention there are no finished battery cells arranged in an accommodating device, but the accommodating device and the electrolytic barrier advantageously together with the electrode arrangements form the electrochemical cells. The side walls of the accommodating device which enclose an accommodating unit and the at least one electrolytic barrier which closes an accommodating unit in this case advantageously virtually form the outer sleeve or the housing of the electrochemical cell. This advantageously enables a weight reduced configuration of a battery unit with more compact dimensions, as a result of which the energy density of the battery unit is advantageously increased.

In accordance with an advantageous configuration of the invention, provision is made for the accommodating units of the accommodating device to each have at least one support element, wherein the electrode arrangement introduced into an accommodating unit of the accommodating device is arranged on the at least one support element. As a result, the production or the construction of a battery unit according to the invention is advantageously simplified.

In a further advantageous configuration of the battery unit according to the invention, the accommodating device has an outer wall bordering all of the accommodating units of the accommodating device. Preferably, the accommodating device consists of a plastic material, wherein the outer wall advantageously has metallization. Owing to the metallization, advantageously the ingress of moisture into the accommodating units of the accommodating device is prevented, which is particularly important when the electrochemical cells, as is preferably provided, are in the form of lithium ion cells.

In particular, provision is made for a plurality of electrode arrangements, which are advantageously connected electrically in parallel with one another, to be arranged in an accommodating unit as an electrode arrangement. In particular, in this case provision is made as an advantageous configuration for a plurality of jelly rolls to be arranged one above the other in an accommodating unit of the accommodating device and to be connected electrically in parallel with one another via the contact making elements thereof.

A particularly advantageous configuration of the battery unit according to the invention envisages that the battery unit comprises at least one first electrically conductive connecting element and at least one second electrically conductive connecting element, wherein the electrochemical cells are electrically conductively connected to one another via the at least one first connecting element and the at least one second connecting element. The electrode arrangements of different accommodating units of the accommodating device are in this case preferably connected electrically in series via a first connecting element and a second connecting element. The cathode contact making element and the anode contact-making element of an electrochemical cell of the battery unit are in this case advantageously each electrically conductively connected to one of the connecting elements so as to electrically interconnect the electrochemical cells to one another. In particular, provision is made for the first electrically conductive connecting element and the second electrically conductive connecting element to be passed out of the accommodating device in order to make electrically conductive contact with the battery unit. Therefore, contact can advantageously be made with the battery unit on at least one outer side of the accommodating device, in particular in order to connect an electrical consumer device to the battery unit or to electrically interconnect the battery unit with further battery units to form a battery module. The at least one first electrically conductive connecting element and the at least one second electrically conductive connecting element in this case advantageously form the main electrical line of the battery unit. In particular, provision is made for the connecting elements to be in the form of metallic flat ribbon conductors, in particular in the form of flat ribbon conductors with a metal transition, preferably in the form of a copper aluminum conductor, nickel aluminum conductor or steel aluminum conductor.

In accordance with a further advantageous configuration, the battery unit according to the invention comprises at least one electrically conductive line pair, which is in electrically conductive contact with at least one electrochemical cell of the battery unit for detecting at least one parameter of this electrochemical cell. In particular, provision is made for the lines of the at least one line pair to be so called sense lines. As parameters, cell voltages and/or cell temperatures of the individual electrochemical cells are advantageously detectable over the line pairs and advantageously transmittable to a so called cell monitoring unit, in particular a cell supervising circuit (CSC). Preferably, the electrically conductive lines are designed in such a way that they can be used for cell individual charging and/or discharging, in particular as part of the forming process.

A further advantageous configuration of the battery unit according to the invention envisages that the accommodating units each have a safety valve, which is advantageously designed to open in the event of a predetermined excess pressure within the accommodating unit. The safety valve is therefore advantageously designed to prevent bursting of an electrochemical cell if the internal pressure of an accommodating unit, in particular owing to severe heating of an electrochemical cell of the battery unit, increases. In particular, provision can be made for a liquid electrolyte to be introduced into the accommodating units closed by the electrolytic barriers via the safety valve or via the opening closed by the safety valve during production of the battery unit, in particular in the case of a configuration of the battery unit according to the invention such that it is foldable about a central multipurpose side wall. In accordance with a further advantageous configuration, provision is made for each accommodating unit to each have an electrolyte filling opening, via which an electrolyte can be introduced into the accommodating unit as part of the production of the battery unit. The opening is then later closed by a closure element, which in particular can be connected to the respective wall of the accommodating unit in which the electrolyte filling opening is introduced in a cohesive manner in particular by means of an ultrasound welding process or a sealing process.

In accordance with a further advantageous configuration, the battery unit according to the invention comprises a degassing collector, which is advantageously designed to accommodate and/or discharge a fluid released by an electrochemical cell of the battery unit. The degassing collector in accordance with one advantageous configuration is in the form of a degassing channel. Advantageously, the degassing collector prevents thermal runaway of an electrochemical cell of the battery unit resulting in an aerosol escaping out of the electrochemical cell from being output to the surrounding environment in an uncontrolled manner.

A particularly preferred configuration of the invention envisages that at least one of the side walls of the accommodating device is in the form of a multipurpose side wall, which is extended with respect to the other side walls by at least one further functionality. In particular, provision is made for the at least one multipurpose side wall to provide a channel like space in which functional units for providing further functionalities can be or are integrated. As a result, a battery unit according to the invention can advantageously be realized so as to be more compact.

In particular, provision is made for the multipurpose side wall to comprise the at least one first electrically conductive connecting element and the at least one second electrically conductive connecting element, wherein the connecting elements preferably have a metal to metal transition, in particular copper to-aluminum, nickel to aluminum or steel to aluminum. In particular, provision is made for the at least one first connecting element and the at least one second connecting element to be cast into the multipurpose side wall, wherein the multipurpose side wall advantageously has contact making openings to each accommodating unit, into which openings the cathode contact making element and the anode contact making element of an electrode arrangement are introduced so as to make electrically conductive contact with the at least one first connecting element and the at least one second connecting element. In this case, provision is in particular made for the contact making elements to be in the form of contact making lugs, which are welded to the connecting elements corresponding to the interconnection of the electrochemical cells. In particular, provision is made for the respective contact making element to be partially surrounded by an insulation element in such a way that the insulation element closes the contact making opening for making contact with the connecting elements in sealtight fashion and therefore the contact making elements are insulated from one another.

A further advantageous configuration of the battery unit according to the invention envisages that the multipurpose side wall comprises the at least one line pair for detecting at least one parameter of an electrochemical cell of the battery unit. In particular, provision is made for the multipurpose side wall to in this case have a channel, in which the lines are introduced. Advantageously, contact is made between the line pairs and the respective electrochemical cell via corresponding contact making points in the respective accommodating units for detecting at least one parameter of said electrochemical cell.

A further particularly advantageous configuration of the battery unit according to the invention envisages that the multipurpose side wall comprises the safety valves of the accommodating units. In particular, provision is made here for the multipurpose side wall to be designed in such a way that a fluid flowing out via a safety valve when said safety valve opens can escape out of the multipurpose side wall.

Preferably, the multipurpose side wall additionally comprises a degassing collector, which is arranged in such a way that a fluid escaping via an open safety valve flows into the degassing collector. Advantageously, the degassing collector is in this case designed to discharge the inflowing fluid, preferably by virtue of a corresponding discharge line being arranged or arrangeable at the degassing collector.

A further particularly advantageous configuration of the battery unit according to the invention envisages that the accommodating units of the accommodating device are arranged as a first row of accommodating units arranged next to one another and a second row of accommodating units arranged next to one another, wherein the side wall of the accommodating device is formed as the multipurpose side wall between the first row of accommodating units and the second row of accommodating units. By virtue of this central arrangement of the multipurpose side wall, the additional functions provided by the multipurpose side wall can be provided in a particularly simple and compact manner. In particular, the interconnection of the electrochemical cells to one another in particular is simplified and is realized with short connecting paths and therefore little complexity in terms of material if the at least one first connecting element and the at least one second connecting element are contained in this central multipurpose side wall.

A further advantageous configuration of the battery unit according to the invention envisages that the accommodating device has at least one hinge element in the region of the multipurpose side wall such that the first row of accommodating units is pivotable towards the second row of accommodating units, in particular in such a way that the first row of accommodating units can be arranged on the second row of accommodating units by means of pivoting. As a result, advantageously the battery unit can be adapted variably to an installation space which is available, advantageously without different manufacture of the battery unit being necessary for this purpose.

Advantageously, the electrode arrangements of the electrochemical cells are arranged in the accommodating units of the accommodating device in such a way that the contact making elements of said electrode arrangements point towards the multipurpose side wall. Advantageously, the production of a battery unit according to the invention is hereby particularly simplified, in particular when the electrically conductive connecting elements and sense lines, safety valves and/or a degassing collector are integrated already in the multipurpose side wall. As a result, advantageously the battery unit is made very compact. Furthermore, the interconnection of the individual electrochemical cells is simplified.

In accordance with a further particularly advantageous configuration of the invention, the accommodating device of the battery unit according to the invention is produced as an injection molded part. As a result, the production of a battery unit according to the invention is advantageously further favored. The at least one first connecting element and the at least one second connecting element are in this case advantageously cast into the plastic of the accommodating device, preferably into the multipurpose side wall. A degassing collector is preferably likewise already cast into the accommodating device. Advantageously, the constructional complexity is hereby further reduced.

A further advantageous configuration of the invention envisages that the accommodating device, advantageously is stackable such that a plurality of battery units can be connected to one another by stacking the respective accommodating device of the battery units one on top of the other, in particular can be mechanically connected to one another. Stacking can in this case in particular also be arranging the battery units next to one another. Furthermore, the battery units are advantageously electrically interconnectable to one another by virtue of the connecting elements being brought into contact with one another. In particular, provision can be made for the accommodating devices to have correspondingly formed contact making elements, which are electrically conductively connected to the at least one first connecting element and the at least one second connecting element, wherein when accommodating devices of a plurality of battery units are stacked one on top of the other, electrical contact is made between these contact making elements in such a way that stacking the accommodating devices one on top of the other effects, in addition to a mechanical connection, also an electrical connection of the battery units. In particular, provision is furthermore made for the accommodating device of a battery unit to also comprise latching and/or fixing elements, advantageously in such a way that a plurality of battery units are connected detachably via the latching and/or fixing elements by means of the accommodating devices being stacked one on top of the other, preferably by virtue of the accommodating devices latching with one another.

A further advantageous configuration of the invention envisages that the accommodating device comprises at least one cooling apparatus, preferably at least one cooling channel. Preferably, at least one cooling channel is integrated in the accommodating device, preferably in at least one side wall of the accommodating device, particularly preferably in the multipurpose side wall. In accordance with a further advantageous configuration, a temperature control unit for heating and/or cooling the electrochemical cells is introduced into one of the side walls or an outer wall of the accommodating device. In particular an electrically operable heating coil is provided as temperature control unit for heating the cells.

In order to achieve the object mentioned at the outset, furthermore a battery module comprising a plurality of battery units is proposed, wherein the battery units are in the form of battery units according to the invention. In particular, provision is made for the battery units to be electrically interconnected to one another. In particular, provision is made for the battery units of the battery module to be stacked one on top of the other, wherein in each case an electrolytic barrier is arranged between two accommodating devices, and the uppermost battery unit of the battery module and the lowermost battery unit of the battery module are advantageously terminated by a module end plate, preferably a metallic or an externally metalized module end plate. The upper and/or lower module end plate and/or at least one of the electrolytic barriers are, in accordance with a further advantageous configuration of the invention, in the form of a cooling plate, advantageously a cooling plate comprising at least one coolant channel, wherein a coolant can be supplied to the module end plate advantageously via coolant connections.

In particular, provision is made for the battery module to comprise a battery management system, wherein advantageously it is possible for a battery unit to be considered as an individual battery cell, on the part of the battery management system or a number of battery cells which corresponds to the number of electrochemical cells of a battery unit is made possible. In this case, advantageously a so called constant current can be tapped off via the main connections provided by the connecting elements. A constant voltage can advantageously be tapped off via the sense lines of the individual battery units, which are preferably integrated in a multipurpose side wall of an accommodating device of a respective battery unit.

BRIEF DESCRIPTION OF THE DRAWINGS

Further advantageous details, features and configuration details of the invention will be explained in more detail in connection with the exemplary embodiments illustrated in the figures, in which.

DETAILED DESCRIPTION

Figure 1:
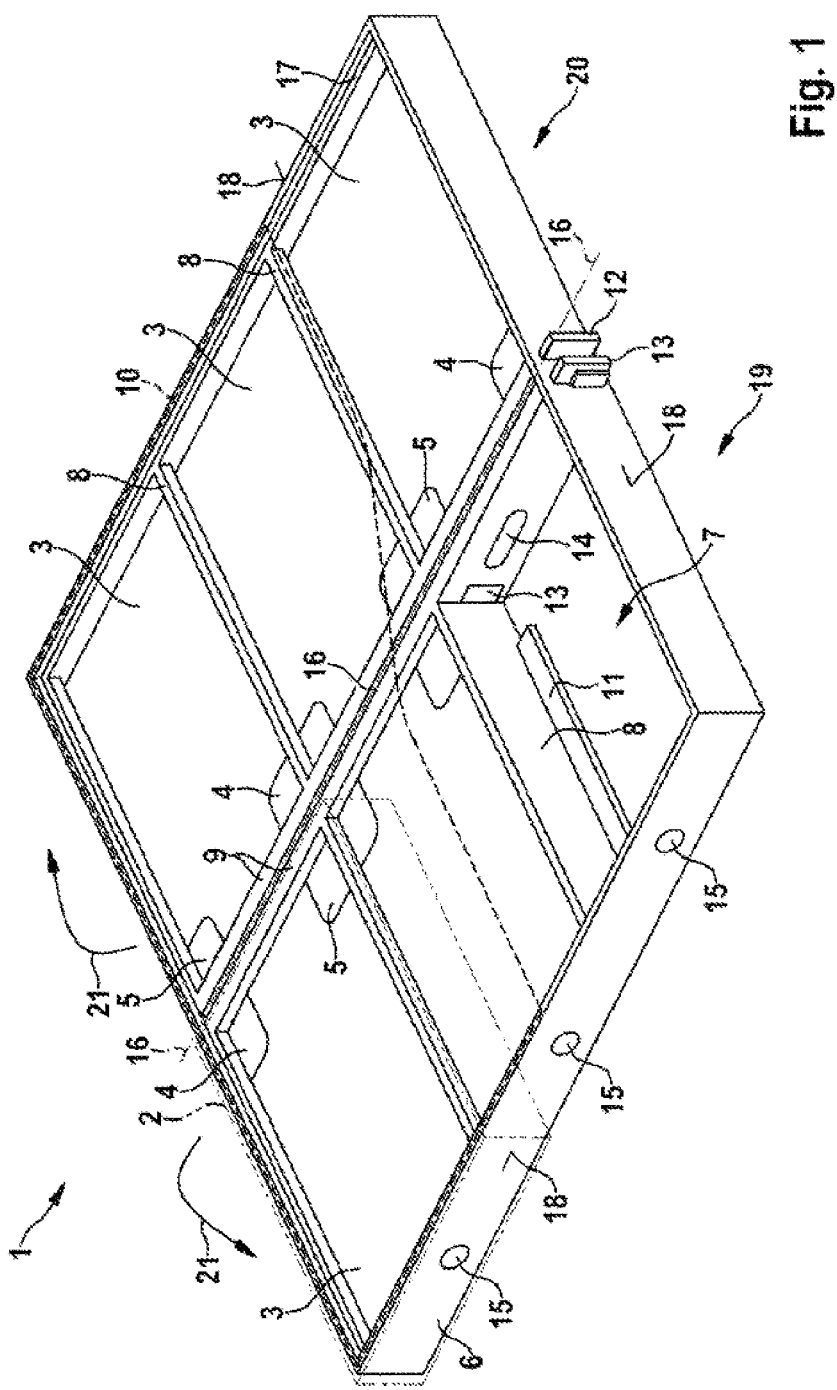
FIG. 1 shows a schematic illustration of a perspective view of an exemplary embodiment of a battery unit according to the invention.

The exemplary embodiment of a battery unit 1 illustrated in FIG. 1 comprises an accommodating device 6 comprising six accommodating units 7, which are each separated from one another by side walls 8. The accommodating device 6 is in this case produced as an injection-molded part. The accommodating units 7 of the accommodating device 6 are arranged as a first row 19 of accommodating units 7 arranged next to one another and a second row 20 of accommodating units 7 arranged next to one another. The side wall of the accommodating device 6 between the first row 19 of accommodating units 7 and the second row 20 of accommodating units 7 is in this case in the form of a multipurpose side wall 9.

In each case one electrode arrangement 3 comprising a cathode contact making element 4 and an anode contact making element 5 is introduced into the accommodating units 7 (FIG. 1 illustrates, for improved clarity, an accommodating unit—in FIG. 1 the accommodating unit 7 facing the observer in row 19—without an electrode arrangement). The accommodating units 7 in this case each have support elements 11, onto which the electrode arrangements 3 of an electrochemical cell 2 are positioned during production of the battery unit 1 according to the invention. The accommodating units 7 are additionally closed by an electrolytic barrier 10 (only illustrated partially for improved clarity in FIG. 1) which is fixed beneath the accommodating device 6 and on the accommodating device 6. In particular, a plastic film, preferably a film consisting of polyethylene or polyether ether ketone is provided as electrolytic barrier 10. In accordance with a variant embodiment (not illustrated), a metallic cooling plate with flat insulation is provided as electrolytic barrier.

In the exemplary embodiment illustrated in FIG. 1, the accommodating units 7 of the accommodating device 6 in addition each comprise electrolyte filling openings 15, via which, once an electrode arrangement 3 has been arranged in an accommodating unit 7 and once the accommodating units 7 have been closed by electrolytic barriers 10, an electrolyte is introduced into the respective accommodating unit 7. In accordance with a preferred configuration, however, a solid electrolyte is provided.

An accommodating unit 7 of the accommodating device 6, which accommodating unit is closed by the electrolytic barrier 10, in this case forms, with the electrode arrangement 3 introduced in the accommodating unit 7, an electrochemical cell 2. Since the battery unit 1 illustrated in FIG. 1 as an exemplary embodiment comprises six accommodating units 7, in which the electrode arrangements 3 are arranged, the battery unit 1 according to the invention comprises six electrochemical cells 2, preferably six rechargeable lithium-ion cells.

The electrode arrangements 3 of the battery unit 1 illustrated in FIG. 1 are in this case in the form of jelly rolls and each have a cathode contact making element 4 and an anode contact-making element 5, which are advantageously in the form of contact making lugs. Said contact making lugs are in contact with first electrically conductive connecting elements 12 and second electrically conductive connecting elements 13 which are cast into the multipurpose side wall 9 of the accommodating device 6 in such a way that the electrochemical cells 2 of the battery unit 1 are connected electrically in series with one another. The electrode arrangements 3 of the battery unit 1 are in this case arranged in the accommodating units 7 in such a way that the contact making elements 4, 5 of said electrode arrangements point towards the multipurpose side wall 9.

A first connecting element 12 and a second connecting element 13 of the battery unit 1 are in this case guided externally on an outer wall 18 of the accommodating device 6 so that contact can thereby be made with the battery unit 1, in particular in order to connect an electrical consumer unit and in order to electrically interconnect the battery unit with further battery units designed in accordance with the invention or to charge the electrochemical cells.

The accommodating units 7 of the accommodating device 6 of the battery unit 1 illustrated in FIG. 1 also each have a safety valve 14, which is designed to open when a predetermined internal pressure is exceeded, in particular an internal pressure which is increased by more than 1 bar in comparison with the ambient pressure, and therefore to prevent bursting of an electrochemical cell 2.

The accommodating device 6 of the battery unit 1 is additionally stackable, advantageously in such a way that a plurality of battery units 1 can be connected to one another by stacking the accommodating devices one on top of the other. For this purpose, the accommodating device 6 has a projection 17, which enables stacking of a plurality of battery units 1, as illustrated by way of example in FIG. 3.

The accommodating device 6 of the battery unit 1 additionally has hinges (not illustrated explicitly in FIG. 1) in the region of the multipurpose side wall 9, said hinges making it possible for the first row 19 of accommodating units 7 to be pivotable about the axis 16 towards the second row 20 of accommodating units 7. In this case, the hinges enable such pivoting that the first row 19 of accommodating units can be arranged on the second row 20 of accommodating units 7 by virtue of the pivoting. In this case, the pivoting takes place about the axis 16. The arrows 21 symbolically represent the rows of accommodating units pivoting apart from one another into the position of the accommodating units 7 shown.

Figure 2:
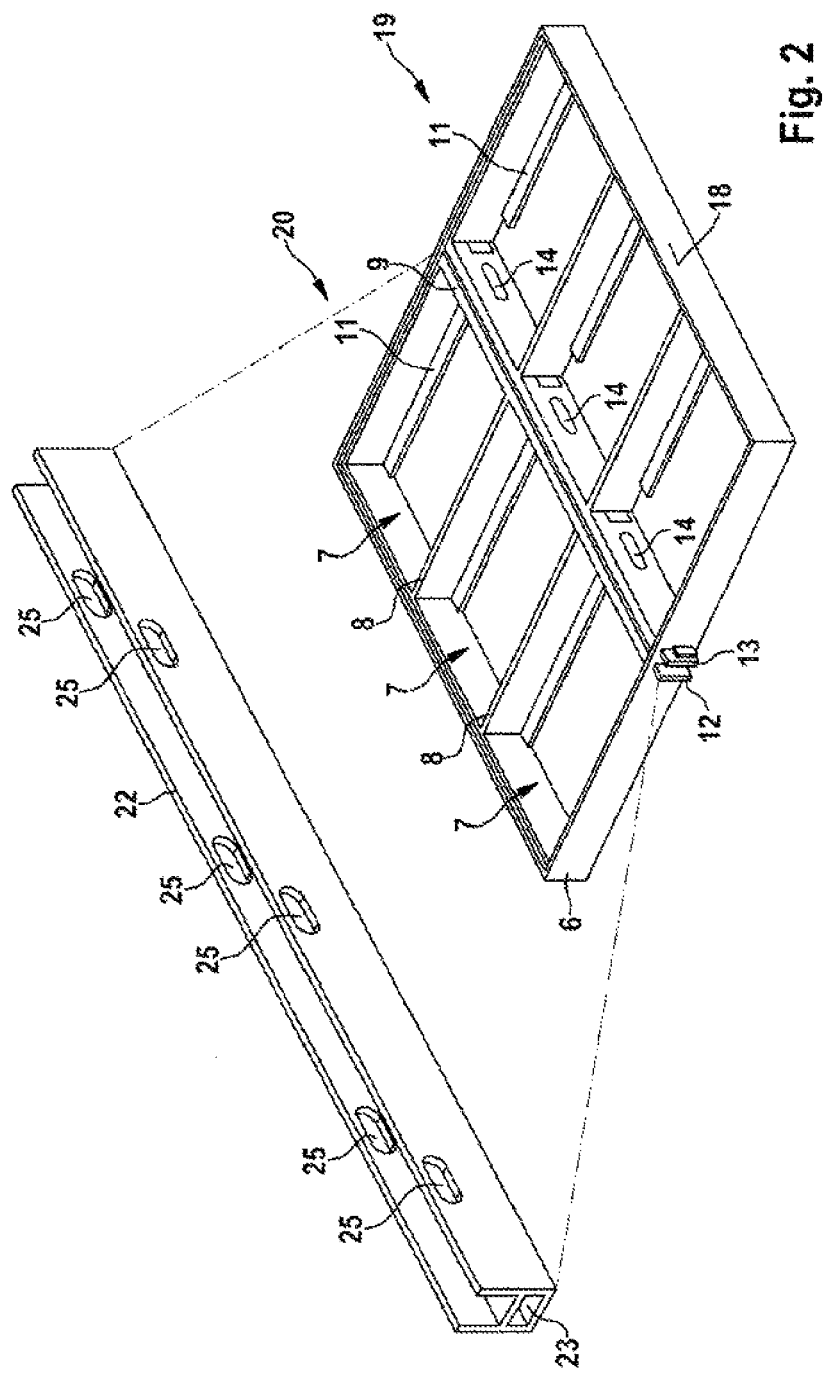
FIG. 2 shows a schematic illustration of a perspective view of an exemplary embodiment of an accommodating device of a battery unit according to the invention.

FIG. 2 shows an exemplary embodiment of an accommodating device 6 of a battery unit 1 according to the invention, which accommodating device has been modified in comparison with the accommodating device illustrated in FIG. 1. Thus, the accommodating device 6 in the exemplary embodiment shown in FIG. 2 comprises a multipurpose side wall 9 comprising a degassing collector 22 and a cooling channel 23 (illustrated in enlarged form separately for improved illustration in FIG. 2). The cooling channel 23 is in this case integrated in the degassing collector 22.

In this case, the degassing collector 22 is in the form of a degassing channel. Said degassing collector has openings 25, via which a fluid escaping through an open safety valve 14 of an accommodating unit 7, in particular a gas, can flow into the degassing collector 22.

In the exemplary embodiment illustrated in FIG. 2, provision is made here for the degassing collector 22 to be closed by a further battery unit 1 or accommodating device 6 of a battery unit 1 being arranged. In accordance with a variant embodiment which is not illustrated, provision is made for the degassing collector 22 to be closed apart from the opening 25 and a discharge opening provided for discharging a fluid. In accordance with a further variant embodiment which is not shown, provision is made for cooling channels to be integrated in at least one of the side walls 8 or an outer wall 18 of the accommodating device 6.

Figure 3:
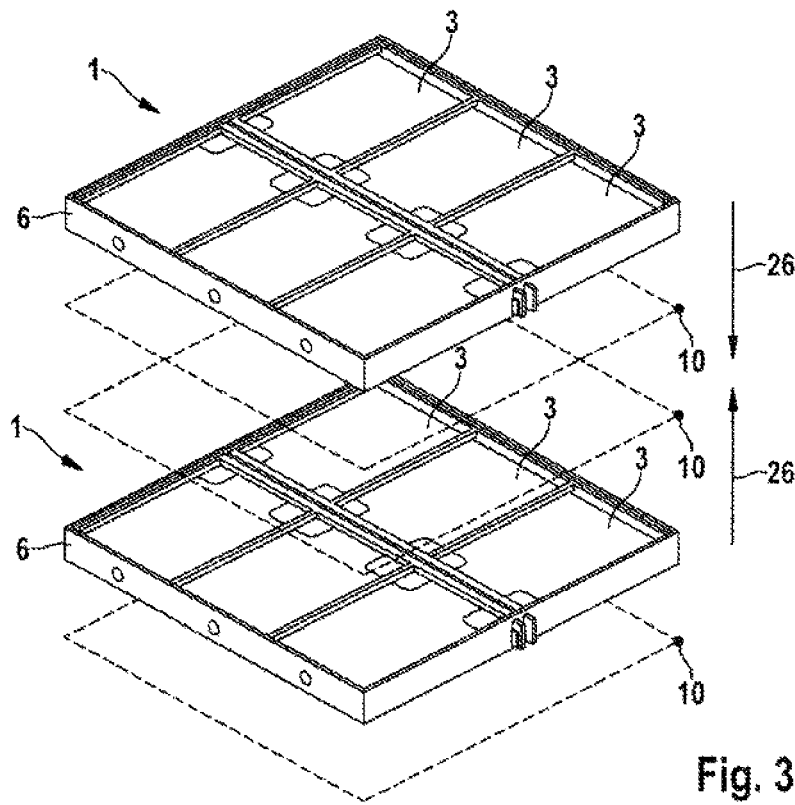
FIG. 3 shows a schematic illustration of a perspective view of an exemplary embodiment of a connection of a plurality of battery units according to the invention.

FIG. 3 shows battery units 1 designed in accordance with the invention, as explained by way of example in connection with FIG. 1, which are connected to one another to construct a battery module. In this case, provision is made for at least one electrolytic barrier 10 to be arranged between the accommodating devices 6. Preferably, an electrolytic barrier 10 in this case closes the accommodating units 7 of the lower battery unit 1 at the top and a further electrolytic barrier 10 closes the accommodating units 7 of the upper battery unit 1 at the bottom. Each accommodating device 6 is therefore closed in each case by an electrolytic barrier 10 on two sides (on the upper side and the lower side in FIG. 3), with the result that each battery unit 1 comprises two electrolytic barriers 10. The assembly of accommodating units 6 and electrolytic barriers 10 is illustrated symbolically by the arrows 26 in FIG. 3. In particular, provision is made for the accommodating devices 6 of the battery units 1 to latch with one another when they are arranged in such a way that the battery units 1 are detachably connected to one another.

Figure 4:
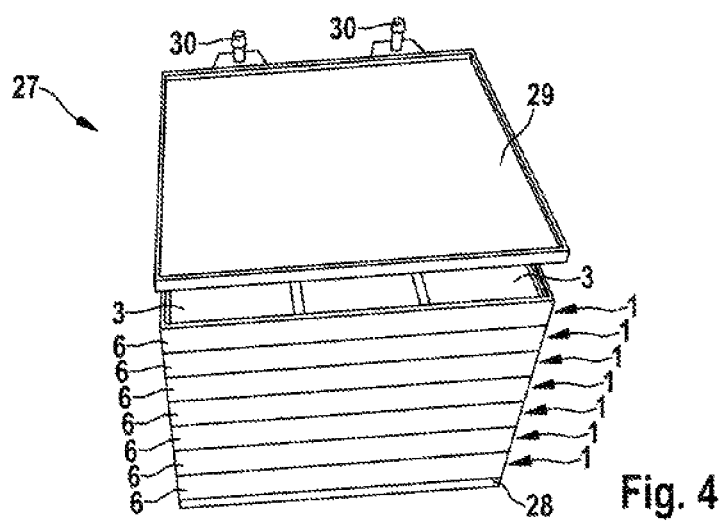
FIG. 4 shows a schematic illustration of a perspective view of an exemplary embodiment of a battery module according to the invention.

FIG. 4 shows an exemplary embodiment of a battery module 27 according to the invention. In this case, a plurality of battery units 1 comprising a plurality of electrochemical cells 2 are stacked one above the other, wherein at least one electrolytic barrier (not explicitly illustrated in FIG. 4) is arranged in each case between two accommodating devices 6, as shown by way of example in FIG. 3. The lowermost battery unit 1 is in this case terminated by a module end plate 28. The uppermost battery unit 1 of the battery module 27 is terminated by a module end plate 29. In this regard, FIG. 4 illustrates the arrangement of the module end plate 29 on the accommodating unit. The module end plate 29 in this case represents an electrolytic barrier for the uppermost battery unit 1, and the module end plate 28 represents an electrolytic barrier for the lowermost battery unit 1.

The module end plate 29 in the exemplary embodiment illustrated in FIG. 4 is in the form of a cooling plate through which a coolant can flow, wherein a coolant can be supplied or discharged via the coolant connections 30. In particular, as an advantageous variant configuration, provision can be made for cooling plates to be arranged as electrolytic barriers at least between some of the battery units 1 of a battery module 27, in particular when there is an increased cooling demand of the electrochemical cells in the intended use area.

The module end plates 28, 29 of the battery module 27 illustrated in FIG. 4 are advantageously metalized, in particular in such a way that complete metallization of the battery module on the outside is provided by the outer walls 18 of the accommodating devices 6 of the battery units 1 and the module end plates 28, 29, with the result that the ingress of moisture into the battery module 27 is advantageously prevented.

Figure 5:
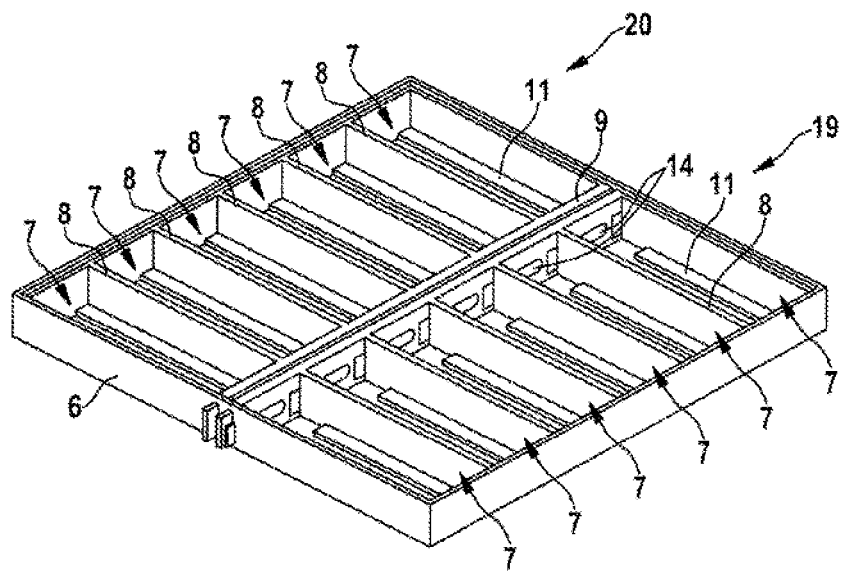
FIG. 5 shows a schematic illustration of a perspective view of a further exemplary embodiment of an accommodating device of a battery unit according to the invention.

FIG. 5 shows a further exemplary embodiment of an accommodating device 6 of a battery unit according to the invention. This accommodating device 6 has, by way of example, 12 accommodating units 7. The number of accommodating units 7 can in principle be selected as desired and depending on the required system requirements, in particular as regards capacity and/or power of a battery unit. In accordance with an advantageous variant configuration (not illustrated), the accommodating units 7 can be plugged together individually or in groups so that an accommodating device 6 can advantageously be extended in a simple manner.

Figure 6:
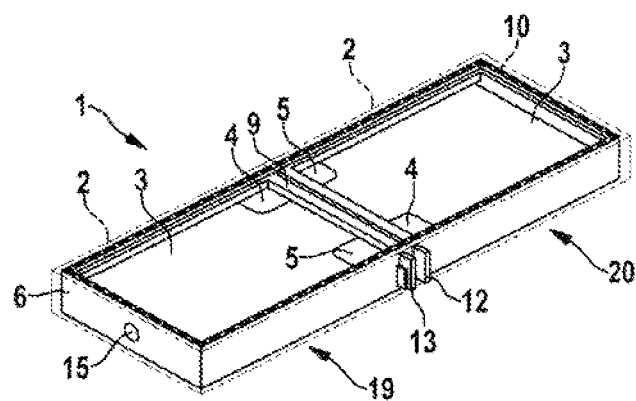
FIG. 6 shows a schematic illustration of a perspective view of a further exemplary embodiment of a battery unit according to the invention.

FIG. 6 shows a further exemplary embodiment of a battery unit 1 according to the invention. Said battery unit in the exemplary embodiment illustrated comprises two electrochemical cells 2. In this case, too, the number of electrochemical cells 2 needs to be determined depending on preset requirements, in particular as regards power and/or capacity of a battery unit.

The embodiment details illustrated in the exemplary embodiments and explained in connection therewith are used for explaining the invention and are not restrictive to the invention.

What is claimed is:
1. A battery unit (1) comprising
a plurality of electrochemical cells (2), which each have an electrode arrangement (3) including a cathode contact-making element (4) and an anode contact-making element (5), an accommodating device (6) including a plurality of accommodating units (7), which are each separated from one another by side walls (8), and
an electrolytic barrier (10) that is connected to the accommodating device (6),
wherein in each case the electrode arrangement (3) of an electrochemical cell (2) of the battery unit (1) is introduced into the accommodating units (7), and
wherein the electrolytic barrier (10) is larger than each of the plurality of accommodating units (7) such that a plurality of the accommodating units (7) are closed by the electrolytic barrier (10), which is connected to the accommodating device (6) in such a way that the closed accommodating units (7) with the electrode arrangements (3) arranged therein form the electrochemical cells (2) of the battery unit (1).

2. The battery unit (1) according to claim 1, characterized in that the battery unit (1) comprises at least one first electrically conductive connecting element (12) and at least one second electrically conductive connecting element (13), wherein the electrochemical cells (2) are electrically conductively connected to one another via the at least one first connecting element (12) and the at least one second connecting element (13).

3. The battery unit (1) according to claim 2, characterized in that at least one of the side walls (8) is in the form of a multipurpose side wall (9), which is extended with respect to the other side walls (8) by at least one further functionality.

4. The battery unit (1) according to claim 3, characterized in that the multipurpose side wall (9) comprises the at least one first connecting element (12) and the at least one second connecting element (13).

5. The battery unit (1) according to claim 3, characterized in that the accommodating units (7) of the accommodating device (6) are arranged as a first row (19) of accommodating units (7) arranged next to one another and a second row (20) of accommodating units (7) arranged next to one another, wherein the side wall of the accommodating device (6) is formed as the multipurpose side wall (9) between the first row (19) of accommodating units (7) and the second row (20) of accommodating units (7).

6. The battery unit (1) according to claim 5, characterized in that the accommodating device (6) has at least one hinge element in a region of the multipurpose side wall (9) such that the first row (19) of accommodating units (7) is pivotable towards the second row (20) of accommodating units (7).

7. The battery unit (1) according to claim 5, characterized in that the electrode arrangements (3) are arranged in the accommodating units (7) in such a way that the contact-making elements (4, 5) of said electrode arrangements point towards the multipurpose side wall (9).

8. The battery unit (1) according to claim 5, characterized in that the accommodating device (6) has at least one hinge element in the region of the multipurpose side wall (9) such that the first row (19) of accommodating units (7) is pivotable towards the second row (20) of accommodating units (7), in such a way that the first row (19) of accommodating units (7) can be arranged on the second row (20) of accommodating units (7) by means of pivoting.

9. The battery unit (1) according to claim 1, characterized in that the battery unit (1) comprises at least one electrically conductive line pair, which is in electrically conductive contact with at least one electrochemical cell (2) of the battery unit (1) for detecting at least one parameter of this electrochemical cell (2).

10. The battery unit (1) according to claim 9, wherein at least one of the side walls (8) is in the form of a multipurpose side wall (9), which is extended with respect to the other side walls (8) by at least one further functionality, and wherein the multipurpose side wall (9) comprises the at least one line pair.

11. The battery unit (1) according to claim 1, characterized in that the accommodating units (7) each have a safety valve (14), which is configured to open in the event of a predetermined excess pressure within the accommodating units (7).

12. The battery unit (1) according to claim 11, wherein at least one of the side walls (8) is in the form of a multipurpose side wall (9), which is extended with respect to the other side walls (8) by at least one further functionality, and wherein the multipurpose side wall (9) comprises the safety valves (14).

13. The battery unit (1) according to claim 1, characterized in that the battery unit (1) comprises a degassing collector (22), which is configured to discharge a fluid released by an electrochemical cell (2).

14. The battery unit (1) according to claim 13, wherein at least one of the side walls (8) is in the form of a multipurpose side wall (9), which is extended with respect to the other side walls (8) by at least one further functionality, and wherein the multipurpose side wall (9) comprises the degassing collector (22).

15. The battery unit (1) according to claim 1, characterized in that the accommodating device (6) is produced as an injection-molded part.

16. The battery unit (1) according to claim 1, characterized in that the accommodating device (6) is stackable such that a plurality of battery units (1) can be connected to one another by stacking the respective accommodating device (6) one on top of the other.

17. The battery unit (1) according to claim 1, characterized in that at least one cooling channel (23) is integrated in the accommodating device (6).

18. The battery unit (1) according to claim 1 further comprising
at least one first electrically conductive connecting element (12) and at least one second electrically conductive connecting element (13), wherein the electrochemical cells (2) are electrically conductively connected to one another via the at least one first connecting element (12) and the at least one second connecting element (13),
at least one electrically conductive line pair, which is in electrically conductive contact with at least one electrochemical cell (2) of the battery unit (1) for detecting at least one parameter of this electrochemical cell (2), and
a degassing collector (22), which is configured to discharge a fluid released by an electrochemical cell (2),
wherein the accommodating units (7) each have a safety valve (14), which is configured to open in the event of a predetermined excess pressure within the accommodating units (7) and via which a fluid may flow into the degassing collector (22),
wherein at least one of the side walls (8) is in the form of a multipurpose side wall (9), which is extended with respect to the other side walls (8) by at least one further functionality, and
wherein the multipurpose side wall (9) includes the at least one first connecting element (12), the at least one second connecting element (13), the at least one line pair, and at least one of the safety valves (14) and the degassing collector (22).

19. The battery unit (1) according to claim 1, wherein the electrolytic barrier (10) is a first electrolytic barrier (10) and the battery unit (1) further includes a second electrolytic barrier (10), and wherein the accommodating units (7) are sealed by the first and second electrolytic barrier (10) that are respectively positioned at opposite ends of the side walls (8).

20. A battery module (27) comprising a plurality of battery units (1), characterized in that the battery units (1) are in the form of battery units according to claim 1.

21. The battery module (27) according to claim 20, characterized in that the battery units (1) are stacked one on top of the other, wherein an electrolytic barrier (10) is arranged in each case between two accommodating devices (6), and an uppermost battery unit (1) of the battery module (27) and a lowermost battery unit (1) of the battery module (27) are terminated by a module end plate (28, 29).

* * * * *